(No Model.) 2 Sheets—Sheet 1.
O. B. SHALLENBERGER.
APPARATUS FOR SYNCHRONIZING ALTERNATE CURRENT DYNAMO ELECTRIC MACHINES.
No. 390,912. Patented Oct. 9, 1888.
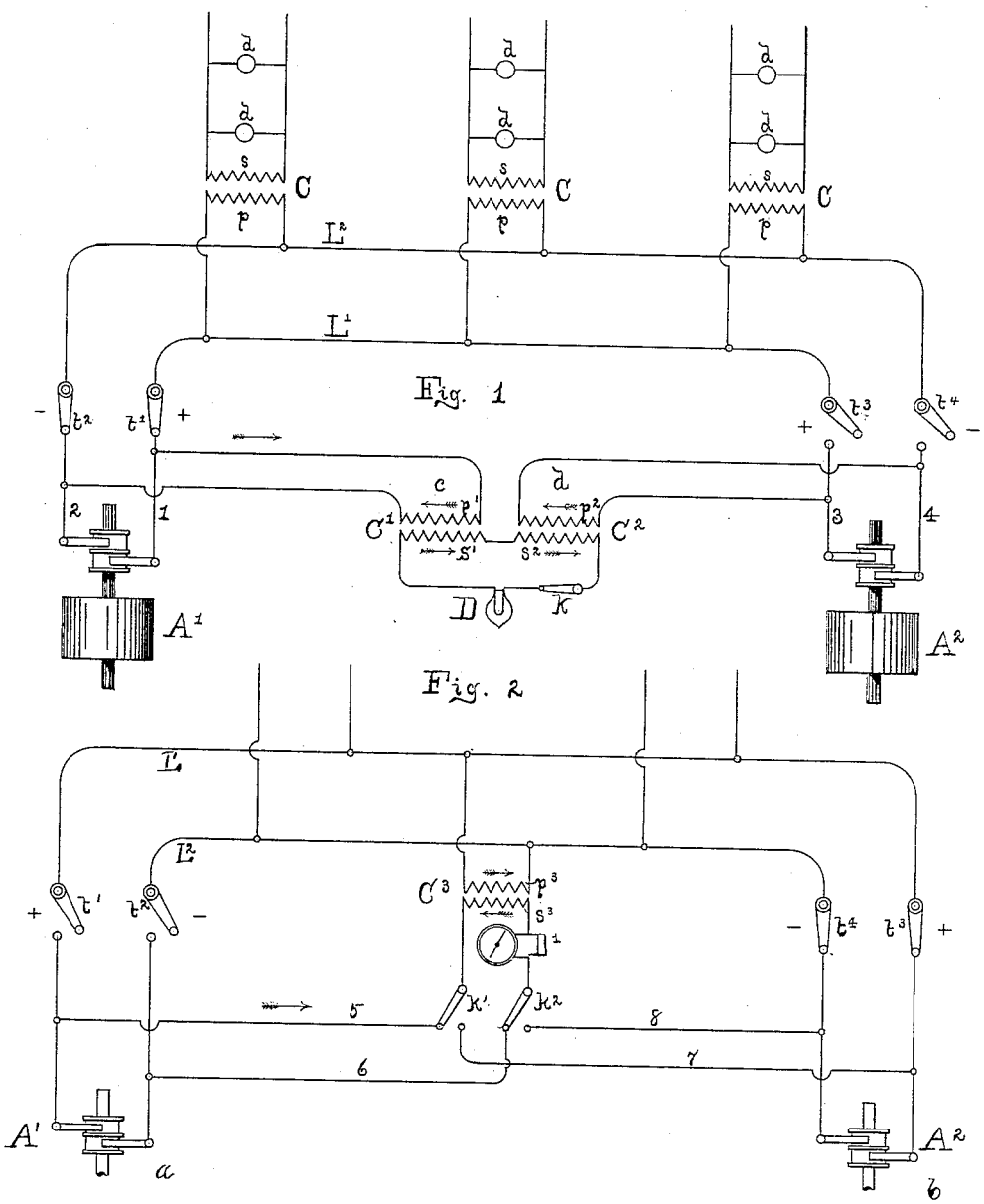
WITNESSES:
Caroline E. Davidson.
Jennie P. Ashley.
INVENTOR,
O. B. Shallenberger.
Pope Edgecomb & Terry, Att'ys.

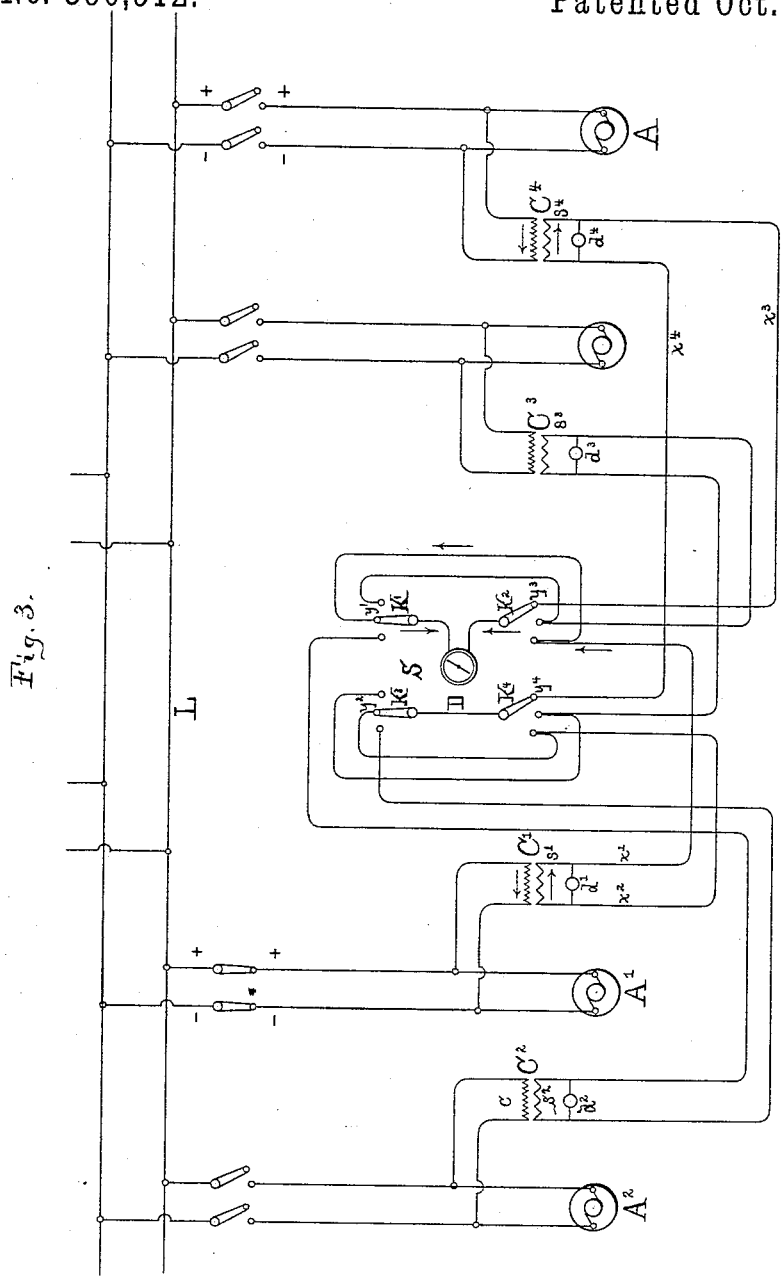

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

APPARATUS FOR SYNCHRONIZING ALTERNATE-CURRENT DYNAMO-ELECTRIC MACHINES.

SPECIFICATION forming part of Letters Patent No. 390,912, dated October 9, 1888.

Application filed December 9, 1887. Serial No. 257,407. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Synchronizing Apparatus and Circuits for Alternate Current Electric Generators, of which the following is a specification.

The invention relates to the organization of circuits and apparatus for indicating the relative phases of different generators delivering alternating, intermittent, or pulsatory electric currents, so that they may be connected with the same circuit at the proper moment to cause their currents to combine and flow in the proper direction for feeding the translating devices to be operated thereby.

The object of the invention is to provide convenient means whereby the effects produced by currents derived from two machines which it is desired to connect with each other may be compared, so that the relative phases may be noted, and also to avoid the necessity of handling currents of high potential in so doing. The currents derived from each generator are sent through the primary coils of corresponding electric converters. The secondary coils are included in the same circuit with an indicating device—such, for instance, as an incandescent electric lamp. It will be apparent that when the currents induced in the secondary coils are in the same direction a given effect will be noted upon the indicator, and the lamp, for instance, will burn at its highest brilliancy. When, however, the induced currents oppose, the lamp will burn at its lowest candle-power or be extinguished.

In the accompanying drawings, Figure 1 is a diagram illustrating the general plan of carrying out the invention. Fig. 2 shows a modification. Fig. 3 is a diagram showing a plan of installing several machines at a central station.

Referring to Fig. 1, A' A² represent two alternate-current electric generators. One of these, A', may be supposed to have its respective poles connected by conductors 1 and 2 and through switches $t'$ and $t^2$ with the main lines L' and L² of a system of electrical distribution. The other generator, A², is provided with conductors 3 and 4 and switches $t^3$ and $t^4$ for connecting it with the lines L' and L²; but the switches $t^3$ and $t^4$ are shown as being open. The currents from the lines L' and L² are employed for operating translating devices $d$ $d$ in any convenient manner—as, for instance, the primary coils $p$ of converters C C C may be connected with the lines L' and L², while the secondary coils $s$ are connected through translating devices. If now the generator A' be considered as delivering currents to the lines L' and L² and it is desired to connect the generator A² in circuit, the indicating device shown at D is employed. This consists of two converters, C' and C², the secondary coils $s'$ $s^2$ of which are connected with each other in series and through the lamp or other indicating device, D. A switch, $k$, may be employed for interrupting this circuit when it is necessary. The primary coil $p'$ is connected across the conductors 1 and 2. The coil $p^2$ is connected across the conductors 3 and 4. If now the currents delivered by the machine A² induce in the coil $s^2$ currents which oppose the currents induced at the same moment in the coil $s'$ by the currents derived from the generator A', then little or no current will traverse the device D; but as the two machines come nearer and nearer into unison the current induced in the secondaries will gradually come into unison also until at the moment when the two currents are in exact unison and combine to flow in the same direction, then the lamp D will burn at its highest degree of brilliancy. By watching the rise and fall in the brilliancy of the lamp the moment may be readily determined at which the two machines are in synchronism, and when the switches $s^3$ and $s^4$ may be closed for the purpose of connecting the generator A² in the circuit.

It has been assumed that the connections of the converters are such that like currents from the two generators will induce currents in like directions in the secondary circuit; but it is evident that the connections may be so changed that the induced currents will oppose instead of assist each other at the proper moment for connecting the generators, in which case the lamp would burn at its lowest brilliancy the moment the machines are to be thrown together.

In Fig. 2 a modification is shown wherein the primary coil $p^3$ of the converter $C^3$ is connected between conductors L' and $L^2$, while the secondary coil, $s^3$, including in its circuit an indicator, D', may be connected by a switch, $k'$ $k^2$, either with the poles of the generator A' or the generator $A^2$ through conductors 5 6 and 7 8, respectively. In this instance the generator $A^2$ is shown as being connected with the main lines, and the generator A' is to be connected. The switch $k'$ $k^2$ is shown as in position to connect the secondary coils $s^3$ of the converter with the poles of the generator A'. The current induced in the secondary coil $s^3$ by reason of the currents traversing the primary coil $p^3$ will be opposed or assisted by the currents from the generator A', accordingly as the two machines are delivering opposing or assisting currents at any given moment. The current which is traversing the secondary circuit will be indicated by the device D', which may be either a galvanometer or lamps or other indicating device. If the current phases of the primary $p^3$ correspond with those sent through the secondary from the generator A', the effect will be to diminish the reading of the indicating device, and at such a moment the generators may be safely coupled together; but if, on the contrary, the effect is such as to make the reading of the indicator at a maximum it would show that the potential at the switch-points was of opposite polarity, and consequently the machines should not be connected at that time.

In Fig. 3 an organization is illustrated as employed at the central station. It has been customary to employ at central stations, in connection with each generator, a small converter, in the secondary circuit of which there is included a pilot-lamp, serving to indicate the difference of potential at the terminals of the armature. By the present invention these small converters may be employed not only for operating the pilot-lamps, but also for comparing the phases of the currents of the different generators. To accomplish this, a switch-board is used, by which means are afforded for connecting the secondary coils of any two of these converters in series with each other through the synchronizing-indicator. In this figure the converters are shown at C', $C^2$, $C^3$, and $C^4$, and the pilot-lights at $d'$, $d^2$, $d^3$, and $d^4$, the latter being connected in the respective secondary circuits of the converters. The synchronizing-indicator is shown at D, and it is placed between two movable switches, K' and $K^2$. Two other switches, $K^3$ and $K^4$, are employed in connection with the switches K' and $K^2$ for securing the requisite circuit-connections. Conductors $x'$ and $x^2$ lead from the respective terminals of the secondary coil $s'$ of the converter C' to switch points $y'$ and $y^2$, which are respectively applied to the switches K' and $K^3$. In like manner conductors $x^3$ and $x^4$ lead from the terminals of the secondary coil $s^4$ of the converter $C^4$ to switch-points $y^3$ and $y^4$, applied to the switches $K^2$ and $K^4$, respectively. If the switches are in the positions shown in the drawings and the generator A' has its poles connected with the lines L' and $L^2$, respectively, and it is then desired to connect the generator $A^4$ in circuit, the respective phases of the currents delivered by the two machines will be indicated upon the device D. The circuit may be traced as follows: From the secondary coil $s'$ through the conductor $x'$ to the point $y'$; thence through the switch K' and indicator D to the switch $K^2$; thence through the point $y^3$ and conductor $x^3$ to the secondary $s^4$; through this coil and the conductor $x^4$ to the point $y^4$; thence through the switch $K^4$, which is electrically connected with the switch $K^3$, and thence through the points $y^2$ and conductor $x^2$ back to the coil $s'$. The relative phases of the two machines will therefore be indicated upon the indicator D, as described with reference to Fig. 1.

For the purpose of synchronizing any of the other machines, the switches $k'$, $k^2$, $k^3$, and $k^4$ are provided with other switch-points connected with the terminals of the several secondary coils in the manner indicated, so that any desired combination may be secured.

I claim as my invention—

1. A synchronizing device for electric generators, consisting of electric converters having their primary coils respectively connected in circuits derived from the respective generators and their secondary coils connected in series with each other, and an indicator connected in circuit with said secondary coils.

2. The combination, with two electric generators delivering alternating, intermittent or pulsatory electric currents, of two converters having their primary coils respectively connected in circuits derived therefrom, an indicating device, and a circuit connecting said indicating device in circuit with the secondary coils of said converters.

3. The combination of two sources of alternating electric currents, circuits derived therefrom, respectively, and brought into inductive relation to each other, and a single electric indicator comparing the effects of the currents in the two circuits.

In testimony whereof I have hereunto subscribed my name this 10th day of November, A. D. 1887.

OLIVER B. SHALLENBERGER.

Witnesses:
REGINALD BELFIELD,
W. D. UPTEGRAFF.